United States Patent [19]

Lidy et al.

[11] Patent Number: 4,965,029

[45] Date of Patent: * Oct. 23, 1990

[54] PROCESS FOR PREPARING POLYURETHANE FOAMS HAVING ZONES OF DIFFERING HARDNESS

[75] Inventors: Werner A. Lidy, Geneva; Rudolf J. Tenhagen, Longirod, both of Switzerland

[73] Assignee: Polyol International BV, Horgen, Switzerland

[*] Notice: The portion of the term of this patent subsequent to Dec. 22, 2004 has been disclaimed.

[21] Appl. No.: 150,642

[22] PCT Filed: Jul. 2, 1987

[86] PCT No.: PCT/GB87/00464

§ 371 Date: Jan. 22, 1988

§ 102(e) Date: Jan. 22, 1988

[87] PCT Pub. No.: WO88/00131

PCT Pub. Date: Jan. 14, 1988

Related U.S. Application Data

[63] Continuation-in-part of Ser. No. 468,058, Feb. 9, 1983, Pat. No. 4,714,574.

[30] Foreign Application Priority Data

Jul. 2, 1986 [GB] United Kingdom ................. 8616132

[51] Int. Cl.$^5$ ............................................. B29C 67/22
[52] U.S. Cl. ................................. 264/45.1; 264/46.4; 264/50
[58] Field of Search ................. 264/45.1, 46.4, 46.5, 264/46.6, 50

[56] References Cited

U.S. PATENT DOCUMENTS

| | | | |
|---|---|---|---|
| 3,229,441 | 1/1966 | Heffner | 264/46.5 |
| 3,366,718 | 1/1968 | Komada | 264/46.9 |
| 3,534,129 | 10/1970 | Bartel | 264/46.4 |
| 3,872,199 | 3/1975 | Ottinger | 264/46.4 |
| 3,873,656 | 3/1975 | Garner | 264/46.6 |
| 3,929,948 | 12/1975 | Welch | 264/45.5 |
| 3,960,998 | 6/1976 | Allen | 264/45.1 |
| 4,190,697 | 2/1980 | Ahrens | 264/46.4 |
| 4,246,213 | 1/1981 | Takamatsu et al. | 264/46.7 |
| 4,379,856 | 4/1983 | Samaritter et al. | 521/51 |
| 4,405,681 | 9/1983 | McEvoy | 264/46.6 |
| 4,714,574 | 12/1987 | Tenhagen | 264/46.6 |

FOREIGN PATENT DOCUMENTS

| | | | |
|---|---|---|---|
| 1086915 | 10/1980 | Canada . | |
| 2052907 | 5/1972 | Fed. Rep. of Germany . | |
| 2523527 | 12/1975 | Fed. Rep. of Germany . | |
| 61-144315 | 7/1986 | Japan | 264/45.1 |
| 62-008784 | 1/1987 | Japan | 264/45.1 |
| WO/8300117 | 1/1983 | PCT Int'l Appl. . | |
| 1229790 | 4/1971 | United Kingdom . | |

*Primary Examiner*—Jan H. Silbaugh
*Assistant Examiner*—Allan R. Kuhns
*Attorney, Agent, or Firm*—Brooks Haidt Haffner & Delahunty

[57] ABSTRACT

A process for preparing a polyurethane foamed article including a hard foam encapsulated by a soft foam is provided. The process provides improved encapsulation over that described in EP 68820 by frothing the hard foam formulation, with for example carbon dioxide, before it is introduced onto the rising soft foam formulation. The hard foam formulation is frothed so that is density is between 75% and 145% of the soft foam formulation.

6 Claims, No Drawings

PROCESS FOR PREPARING POLYURETHANE FOAMS HAVING ZONES OF DIFFERING HARDNESS

This application has an International Filing Date of Jul. 2, 1987, and was therefore co-pending with application Ser. No. 468,058 (PCT filed: Jun. 24, 1982, §§ 102(e) and 371 Date: Feb. 9, 1983), now U.S. Pat. No. 4,714,574 (issued: Dec. 22, 1987). Application Ser. No. 468,058 is in the name of Tenhagen and contain subject matter disclosed and claimed in this application. This application is a continuation-in-part of application Ser. No. 468,058.

The present invention relates to the production of polyurethane foams which have one or more zones of hard foam encapsulated within a soft foam.

Polyurethane foams having zones or layers of differing hardness are becoming increasingly important for use in the modern seating industry. In particular, seats made from such foams are being used in the automotive industry where it is becoming important to reduce the mass of seats, for fuel efficiency reasons, without a loss in comfort or support for the driver.

Although it is known to improve the characteristics of polyurethane foam seats by use of support wires or by fabricating the seats out of individually foamed parts of differing hardness, two alternative technologies have recently been developed with a view to simplifying the manufacturing process.

The first of these alternatives has been described in U.S. Pat. No. 4,190,697. This patent discloses an integral polyurethane foam comprising layers of foam having different hardness. Thus there is disclosed a seat cushion comprising a supportive lower layer of firm foam beneath a more comfortable upper layer of soft foam. The patent also describes a process of making such polyurethane foams by adding a firm foam formulation to a mould, allowing the firm foam formulation to rise and adding a soft foam formulation to the rising firm foam formulation under conditions such that the soft foam formulation passes through the firm foam formulation to yield the layered structure. Preferably the soft foam formulation is added after the firm foam formulation has risen between about 10 and 80% of its potential rise.

The other alternative technology has been described in our European Patent No. 68820. This patent discloses a process for making an integral polyurethane foams which comprises encapsulated zones of a firm foam in a soft foam which is particularly suitable for producing side rolls and lumbar supports for automobile seats. The process for manufacturing such foams comprises adding first a soft foam formulation to a mould, allowing the soft foam formulation to rise and subsequently adding a firm foam formulation under conditions where the firm foam formulation does not pass through the soft foam formulation but is instead encapsulated by it. The firm foam is preferably added either (1) at a time where the soft foam formulation has expanded by an amount in the range 250% to 1400% of its original volume or (2) at between t+3 and t+15 (seconds t is the cream time of the soft foam formulation) after the soft foam formulation has been introduced.

With regard to the process of the later patent it is known that the optimum encapsulation of the firm formulation by the soft occurs when the density difference between the two formulations at the moment the firm foam formulation is added is as small as possible. In minimising the density difference, however, a problem is encountered. This arises because the soft foam is rising and decreasing in density when the firm foam is added whilst the firm foam is in an unrisen, relatively dense state when it is introduced into the mould. In order to overcome this problem, it has therefore been necessary to introduce the firm foam formulation relatively soon after the soft foam formulation is poured and to use soft foam formulations of relatively low reactivity so that a rapid rise of the soft foam is avoided.

A modified process has now been discovered which allows the process of EP No. 68820 to be operated with a much wider range of soft foam formulations including those of higher reactivity relative to those previously employed. In addition, for a given set of processing conditions the degree of encapsulation, as defined by the minimum thickness of the encapsulating over the encapsulated foam, is improved thereby improving product quality. The process comprises introducing, a frothing agent which causes the firm foam formulation to froth as soon as it leaves the mixing head, thereby rapidly decreasing its density. The frothing agent is added in addition to the standard blowing agents e.g. water which causes the firm foam formulation to rise further once it is inside the mold.

Accordingly, the present invention provides a process for the production of a moulded flexible polyurethane foam article comprising a firm polyurethane foam encapsulated in a soft polyurethane foam which process comrpises introducing into a mould a soft foam formulation; allowing the soft formulation to rise and expand its volume by between 100% and 2300% and thereafter introducing a hard foam formulation onto the soft foam formulation characterised in that the hard foam formulation comprises a polyfunctional isocyanate, a polyfunctional alcohol, a blowing agent and sufficient frothing agent to cause the hard foam formulation, when introduced onto the soft foam formulation, to have frothed to the extent that the density of the hard foam formulation is between 75 and 145% of the density of the soft foam formulation.

The process described above has the advantage that it can be applied to existing foam mixing/dosing aparatus. The use of a frothing agent is effective in combination with low pressure polyurethane foam dispensing machines which mechanically mix pressurized streams of the formulation components. Such dispensing machines have a mixing chamber which partially despressurise and hold up the foam formulation before ejecting it. By controlling therefore the quantity of frothing agent in the formulation and the residence time in the mixing chamber the density of the second foam formulation can be accurately controlled. The frothing agent can be introduced as a separate stream into the mixing head or in one of the resin streams.

The process can also be employed in combination with high pressure polyurethane foam dispensing machines in which mixing of the formulation components is effected by high pressure impingement of the reactant streams on each other. However in machines of this type it is preferably to dissolve or inject the frothing agent into either the polyfunctional alcohol or polyfunctional isocyanate stream before mixing takes place since direct injection of the frothing agent into the mixing head of the dispensing machine generally results in poor frothing.

As regards the frothing agent this is suitably either an inert gas e.g. air, carbon dioxide, nitrogen and the like or an artificial blowing agent which is highly volatile at ambient temperature such as a chlorofluoromethane e.g. $CCl_3F$, $CCl_2F_2$ and $HCFCl_2$, butane, hexane and the like. A preferred frothing agent is carbon dioxide.

As mentioned above, in order to obtain improved encapsulation, it is important to ensure that, when the second relatively hard foam formulation is introduced upon the rising first relatively soft foam formulation, the densities of the two foam formulations are similar. Suitably at the time of introduction of the second relatively hard foam formulation it should have a density which is between 75% and 145% of the density of the rising first relatively soft foam formulation and preferably in the range 85% to 125% most preferably 95% to 120%.

As regards the standard components of the soft and hard foam formulations these will be familiar to the skilled man. Full details of the types of formulations are disclosed in detail in EP No. 68820 the relevant subject matter of which is herein incorporated by reference. Briefly the polyfunctional isocyanate is preferably one which is used extensively on a commercial scale. In practice this means toluene diisocyanate (TDI), the isomers and higher homologues of di(isocyanatophenyl)methane (MDI) and prepolymers of such compounds with polyether polyols, polymer polyols or polyamines.

Likewise the polyfunctional alcohols (known in the art as polyols) are preferably polyether polyols prepared by alkoxylating simple diols or triols with one or more of ethylene oxide, propylene oxide or butylene oxide.

In order to prepare foams it is necessary that both soft and hard foam formulations incorporate a blowing agent. This is particularly necessary in the case of the hard foam formulations since although the frothing agent causes a certain amount of blowing, it is insufficient to produce a fully risen foam. Typical blowing agents are water and artificial halocarbons which are slightly less volatile than those used as frothing agents. The preferred blowing agent is water.

In addition to the above components it is usually desirable to add catalysts, surfactants, foam stabilisers, softness control additives, chain extenders, flame retardants and the like, as detailed in EP No. 68820, to modify the physical properties of the foam formulations.

The moulding process is suitably carried out in an open top mould having a lid which can be closed after the foam formulations have been introduced. Once the mould is closed the foam formulations are allowed to rise fully and then cure. After curing the moulded article may be demoulded.

The process of the present invention will now be described by reference to the following Examples.

EXAMPLE 1

For this experiment and the following comparative test a mould of the type used for making polyurethane automobile seats was employed. The mould was of a design such that the final moulded article comprised a central seat portion and two supporting side rolls.

The mould was filled from a polyurethane high pressure dispensing machine. The dispensing machine had three imput streams (2 polyol, 1 isocyanate) and a high pressure mixing head. The dispensing machine was connected to the end of a robot arm.

The 3 streams to the mixing head were as follows:

| Stream 1 | Polyol for producing a soft foam formulation |
|---|---|
| 100 parts by weight | polymer polyol having a 16% by weight styrene/acrylonitrile copolymer content (BP - U1315) |
| 3.2 parts by weight | water |
| 0.05 parts by weight | UCC A-1 amine catalyst |
| 0.5 parts by weight | air products 33LV amine catalyst |
| 0.8 parts by weight | BP SH-207 silicone surfactant |
| Stream 2 | Polyol for producing a firm foam formulation |
| 100 parts by weight | polymer polyol having a 30% by weight styrene/acrylonitrile copolymer content (BP - RP1318) |
| 2.8 parts by weight | water |
| 0.5 parts by weight | diethanolamine |
| 0.7 parts by weight | air products 33LV amine catalyst |
| 1.0 parts by weight | BP SH-209 silicone surfactant |
| Stream 3 | Isocyanate stream |

This stream comprised a blend of 80% TDI (80/20) and 20% crude MDI. The isocyanate was used in each formulation in amounts such that each formulation had an index of 100.

In addition to the above, carbon dioxide was introduced into Stream 2 via the recirculation stream. The amount of carbon dioxide introduced was such that the foam formulation derived from Stream 2 had a density of 250 g/liter when it left the mixing head.

Processing Details

Mould temperature = 50°–55° C.
Demould time = 8 minutes

1. Stream 1 and Stream 3 were mixed to produce a soft foam formulation. The soft foam formulation was poured into the seat and side roll areas of the open mould using the robot arm to move the dispensing machine across the mould. Pouring time for the soft foam formulation was 3.7 seconds.

2. Stream 2 and Stream 3 were mixed to produce a firm foam formulation. This formulation was in a frothed state when poured into the mould because of the presence of carbon dioxide in Stream 2. The firm foam formulation was poured stripwise into the left and right side rolls sequentially (as described in EP No. 68820) 3 seconds and 6 seconds respectively after step 1 was complete. The pour time in each case was 1 second. During step 1, the density of the firm formulation was between 100 and 120% of the rising soft foam formulation.

3. The mould was closed and the contents allowed to cure. The moulding produced by the above method had side rolls comprising firm foam encapsulated with soft foam. At its minimum the thickness of soft foam covering the firm foam was 1 cm.

Comparative Test

Example 1 was repeated except that no carbon dioxide was introduced into Stream 2 and hence no control was kept on the density of the firm foam. The moulding produced by the above method had side rolls comprising firm foam encapsulated with soft foam. However in this case at its minimum the thickness of the soft foam covering the firm foam was 0.3 cm.

We claim:

1. A process for the production of a moulded flexible polyurethane foam article comprising a firm polyurethane foam encapsulated in a soft polyurethane foam which process comprises introducing into a mould a soft foam formulation; allowing the soft foam formulation to rise and expand its volume by between 100% and 2300% and thereafter introducing a hard foam formulation onto the soft foam formulation, wherein the improvement comprises that the hard foam formulation comprises a polyfunctional isocyanate, a polyfunctional alcohol, a blowing agent and sufficient frothing agent to cause the hard foam formulation, when introduced onto the soft foam formulation, to have frothed to the extent that the density of the hard foam formulation is between 75 and 145% of the density of the soft foam formulation.

2. A process as claimed in claim 1 wherein the density of the hard foam formulation is between 85% and 125% of the density of the soft foam formulation.

3. A process as claimed in claim 2 wherein the density of the hard foam formulation is between 95% and 120% of the density of the second foam formulation.

4. A process as claimed in claim 1 wherein the frothing agent is carbon dioxide.

5. A process as claimed in 4 wherein the blowing agent is water.

6. A process as claimed in claim 1 wherein the process further comprises the subsequent steps of (a) closing the mould and allowing the foams to rise fully and (b) allowing the foams to cure.

* * * * *